F. DE MARCO.
MOTOR TRACTOR.
APPLICATION FILED AUG. 18, 1917.
1,256,527.
Patented Feb. 19, 1918.
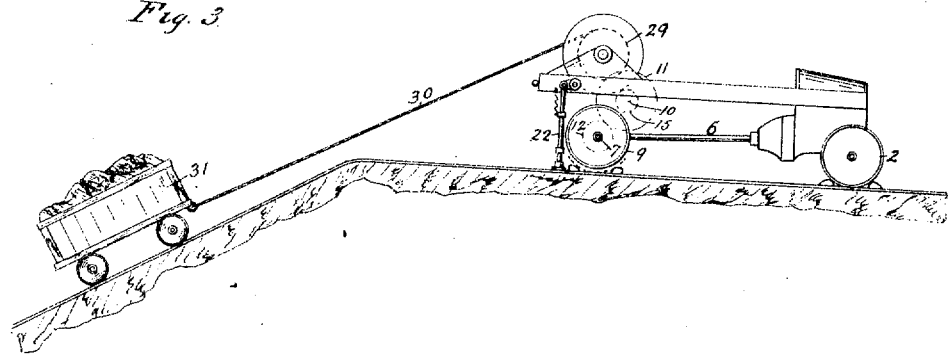
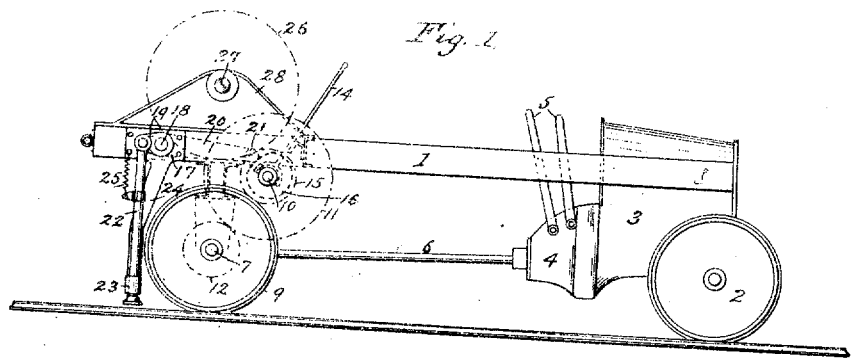
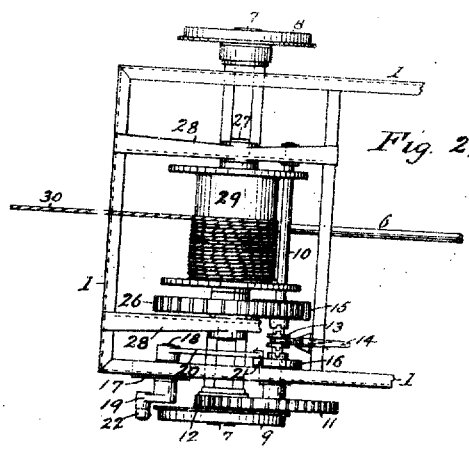
Inventor
Frank De Marco
By his Attorney
Wm Bodge

UNITED STATES PATENT OFFICE.

FRANK DE MARCO, OF NEW YORK, N. Y.

MOTOR-TRACTOR.

1,256,527.      Specification of Letters Patent.      Patented Feb. 19, 1918.

Application filed August 18, 1917. Serial No. 186,963.

*To all whom it may concern:*

Be it known that I, FRANK DE MARCO, a citizen of the United States, and resident of New York, in the county of New York and State of New York, have invented certain new and useful Improvements in Motor-Tractors, of which the following is a specification.

The invention relates to improvements in motor-tractors of a class in which the power plant is designed to be used either as a traction engine for hauling loads along a railway or roadway, or as a stationary engine for general power work; and the object of the invention is to provide means for readily adapting the motor for the double use, and also to utilize the power thereof to effect the adjustment of parts of the mechanism required for such variable use. The invention further includes certain details of construction and arrangement of parts hereinafter set forth.

In describing the invention in detail, reference is had to the accompanying drawings, forming a part of this specification, and wherein like characters of reference are used to designate corresponding parts throughout the several views, and in which:

Figure 1 is a side elevation of a motor-tractor arranged to run upon a railway and provided with the improvement embodied in the present invention; Fig. 2, a ground plan of a portion of the body of the tractor, showing the rear driving axle and connected gearing; Fig. 3 a reduced side elevation of the motor-tractor, shown as operating as a stationary hoisting engine for elevating a loaded car; and Fig. 4 is an enlarged detail view of the two-part rear axle of the tractor, showing the differential or balanced driving gear and connected housing partially in section.

In the drawings, numeral 1 designates the body or frame of the tractor, 2, the front wheels thereof, and 3 and 4, the housings of the motor and transmission gearing respectively, the motor and transmission being of common type, provided with the usual operating means, including in part the levers 5. Extending rearwardly from the transmission case, is the drive shaft 6, arranged and connected up in well-known manner for differentially driving the two-part rear axle 7, the latter being provided, at their adjacent inner ends with the usual balanced gearing, as clearly shown in Fig. 4 and at their outer ends with a pair of fast traction wheels 8 and 9.

The body of the vehicle is supported upon the rear driving axle in any approved manner, and is provided with suitable bearings in which is journaled the jack-shaft 10, having at its outer end the fast gear 11, engaged by the smaller driving gear 12, the latter being fast to the hub of the traction wheel 9 and arranged to receive its motion from the axle part connected therewith. Mounted upon the jackshaft 10, and slidable lengthwise thereof in driving engagement, is a double-jawed clutch member 13 of common construction, provided with the usual shifter-handle 14. Loosely mounted on the jack-shaft at one side of the clutch member for engagement with the latter, is a driving gear 15, and at the opposite side of the clutch member for corresponding engagement therewith is a cam 16, also loosely mounted on the jack-shaft, the lateral position of said loosely mounted gear and cam being maintained upon the jack-shaft by the usual collars, not shown.

The body of the vehicle is also provided with a bracket bearing 17, in which is hingedly mounted a stub-shaft 18, to the outer end of which is fixed an arm 19 and upon the inner end a lever 20, the latter provided at its free end with a roller 21, arranged for engagement by the cam 16. To the free end of the arm 19 is hingedly connected a vertically depending jack-bar 22, loosely guided at its lower end by the socket 23 formed on the extension 24 of the bracket bearing 17. As thus connected, the jack-bar is adapted to receive vertical movement, its upward movement and upper position with relation to the body of the car being respectively effected and maintained by the spring 25, the latter having its opposite ends connected respectively to the jack-bar and to the body of the vehicle. The relative downward movement of the jack-bar is accomplished against the action of the spring and through the arm 19, stub-shaft 18, lever 20 and roller 21 by the rotation of the cam 16, which latter in its working movement causes the lower end of the jack-bar to engage the track or ground surface and in reaction therewith to elevate or jack up a portion of the body of the car together with its adjacent wheel 9, for the release of the tractive force of the latter, and the free rotation of the connected axle part, while the opposite axle part and connected traction wheel are at rest.

As indicated in Fig. 2 of the drawings, the clutch member 13 is in neutral position, the wheels of the car bearing upon the tracks and the jack-bar 22 held clear thereof. With the parts as thus disposed, the motor-tractor is free to haul or transport loads in the usual manner. When it is desired to utilize the tractor as a stationary engine, as shown in Fig. 3, the wheels of the car are chocked to prevent the latter's movement, and the cam 16 is engaged by the clutch member 13 by means of the shifter-handle 14. The motor is then started and the power therefrom is transmitted through the drive shaft 6 and rear axle 7, causing the traction wheels to temporarily slip upon the tracks while the power from the rear axle is transmitted through the gears 12 and 11 for the rotation of the cam 16 and the consequent depression of the jack-bar 22 and the release of the traction wheel 9 for the free rotation thereof. As thus positioned, the clutch member is then withdrawn from the cam, allowing the latter to remain at rest while the jack-shaft 10 continues its rotation and is free to be used for general power purposes by engaging the clutch member thereof with the driving gear 15, the latter engaging the larger gear 26, fixed upon the power receiving shaft 27, journaled in the standards 28. As herein shown, the power receiving shaft is provided with a hoisting-drum 29, having a cable 30, attached to a loaded car 31 and arranged to elevate the latter up an inclined way, as from a mine, to the tractor level, where direct connection and transportation may be made by means of the tractor.

While I have shown the power receiving shaft as being connected in driving relation with a hoisting-drum, it will be obvious that the same may be employed for various power purposes. It will also be seen that the driving arrangement may be readily started and stopped by means of the shifter-handle 14, or from the operating levers of the motor itself, which latter also provides for reversing the direction of rotation of the entire mechanism.

From the above it will be evident that the motor-tractor may be quickly converted to operate as a stationary engine with little or no manual labor, and in a similar manner may be changed back to a traction engine arrangement by simply shifting the handle 14 again to rotate the cam and lower the traction wheel 9 upon the track.

What I claim as my invention and desire to secure by Letters Patent, is:

1. A motor-tractor comprising a vehicle provided with a power plant, a two-part differential driving axle therefor having traction wheels fast thereon, driving connections between said power plant and axle normally adapted to propel said vehicle in opposite directions, means for releasing the traction of one of said wheels to permit the rotation of its connected axle part while the vehicle is at rest, and a power receiving shaft in driving connection with said rotatable axle part.

2. A motor-tractor comprising a vehicle provided with a power plant, a two-part differential driving axle therefor having traction wheels fast thereon, driving connections between said power plant and axle normally adapted to propel said vehicle in opposite directions, means carried by said vehicle and actuated by the power plant thereof for releasing the traction of one of said wheels to permit the rotation of its connected axle part while the vehicle is at rest, and a power receiving shaft in driving connection with said rotatable axle part.

3. In a motor-tractor, the combination with a two-part differential driving axle having traction wheels fast thereon, of a power receiving shaft geared to be rotated from one of the parts of said axle, and means for releasing the wheel traction of said geared axle part to permit the rotation thereof while the vehicle is at rest.

4. In a motor-tractor, the combination with a two-part differential driving axle having traction wheels fast thereon, of a jack-shaft driven from one of said axle parts, a power receiving shaft, a detachable driving connection between said jack-shaft and power receiving shaft, and means for releasing the wheel traction of said geared axle part to permit the rotation thereof while the vehicle is at rest.

5. In a motor tractor, the combination with a two-part differential driving axle having traction wheels fast thereon, of a power receiving shaft geared to be rotated from one of the parts of said axle, and a jack operatively mounted upon said tractor and adapted to raise and lower said geared axle part for the respective release and reëngagement of the tractive surface of its connected wheel while the opposite wheel is at rest.

6. In a motor-tractor, the combination with a two-part differential driving axle having traction wheels fast thereon, of a jack-bar operatively mounted on said tractor and adapted to exert a thrust in opposition to the ground surface to release the wheel traction of one of said axle parts to permit the rotation thereof while the vehicle is at rest, a jack-shaft driven from said rotatable axle part, and a cam detachably connected to said jack-shaft and arranged to actuate said jack-bar.

7. A motor-tractor comprising a vehicle provided with a power plant, a two-part differential driving axle therefor having traction wheels fast thereon, driving connections between said power plant and axle normally adapted to propel said vehicle in opposite directions, means for raising one of said wheels to permit the rotation of its connected axle part while the opposite wheel is at rest, and a power receiving shaft in driving connection with said rotatable axle part.

Signed at New York in the county of New York and State of New York this 14th day of August A. D. 1917.

FRANK DE MARCO.